Aug. 14, 1934.  T. FIELD  1,970,294
POULTRY BLEEDER AND BRAINING DEVICE
Filed April 20, 1932
FIG. 1.
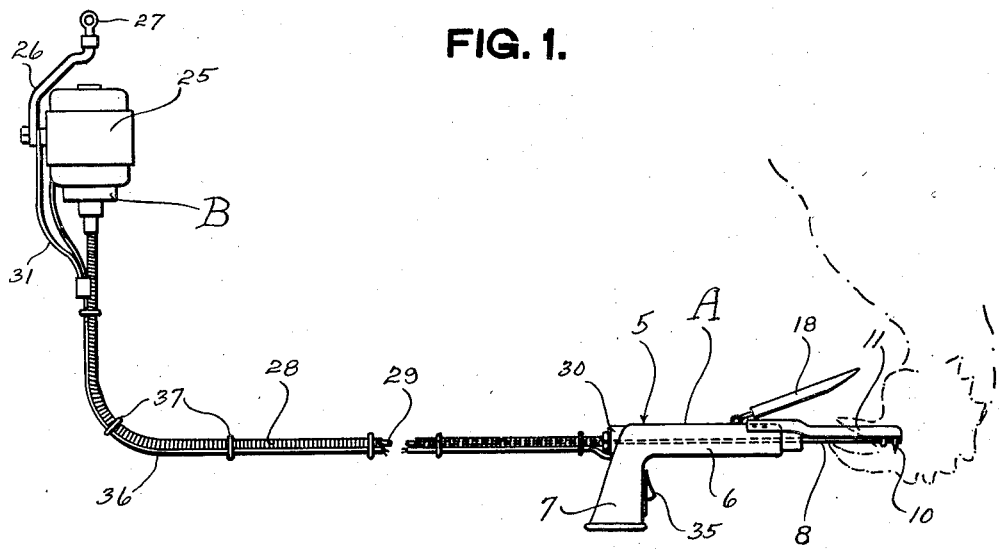
FIG. 2.
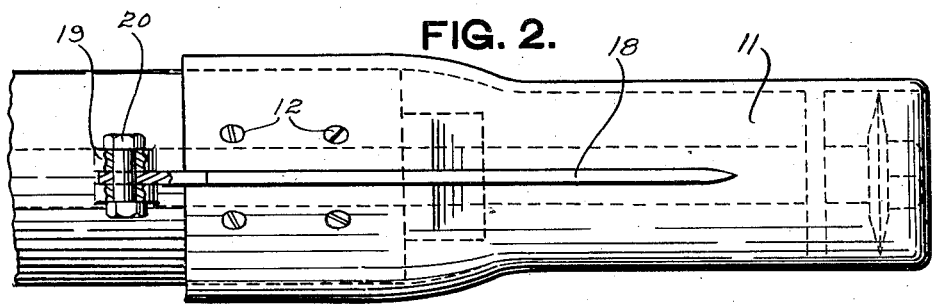
FIG. 3. FIG. 4.
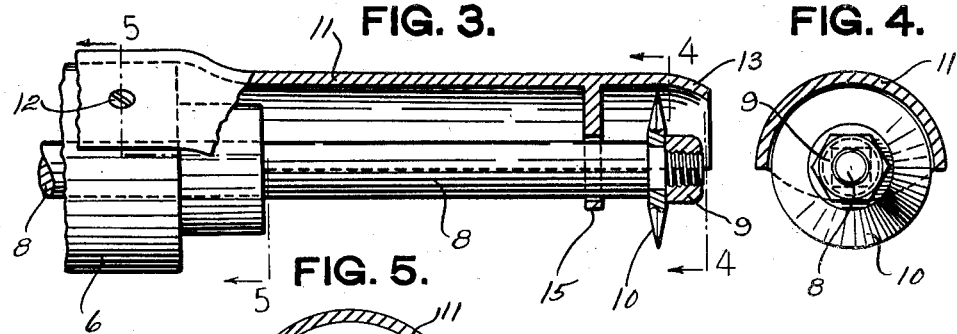 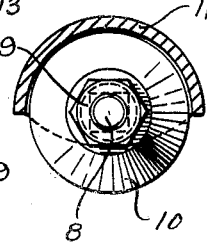
FIG. 5.
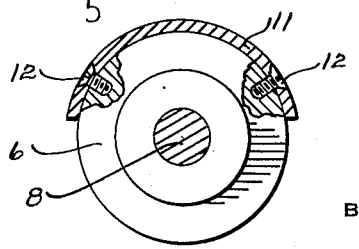
INVENTOR:
Timothy Field
BY Lancaster, Allwine and Rommel
ATTORNEYS.

Patented Aug. 14, 1934

1,970,294

UNITED STATES PATENT OFFICE 1,970,294

POULTRY BLEEDER AND BRAINING DEVICE

Timothy Field, Dubuque, Iowa

Application April 20, 1932, Serial No. 606,455

2 Claims. (Cl. 17—11)

The present invention relates to poultry killing instruments and the primary object of the invention is to provide a poultry bleeding and braining device wherein the bleeding operation will be properly performed and misbleed prevented.

In the killing of poultry, proper bleeding is essential for the better appearance of the fowl when dressed. With the manual knifing method in general use, the percentage of misbleed is extremely high and when the fowl has been misbled, it is generally termed a third class fowl when otherwise, if properly bled it would have been a first class fowl. This misbleeding results in considerable loss to the poultry house and is due to improper severing of the jugular veins in the roof of the fowl's mouth. These veins run longitudinally in the roof of the mouth and the usual procedure of manual knifing or bleeding is to insert a knife well back in the fowl's mouth and then withdraw the knife in a diagonal direction so as to sever the veins. Owing to the longitudinal position of the veins in the roof of the fowl's mouth, it often occurs that the veins are not severed by this diagonal withdrawal of the knife, resulting in a misbled fowl which is practically worthless for marketing because of the discolored area in the neck near the head, caused by the clotting of the blood.

It is therefore a further object of the invention to provide a poultry bleeder embodying a rotary bleeding knife so supported as to extend transversely of the veins and insure severing of the veins for proper bleeding.

A further object of the invention is to provide an electrically driven poultry bleeder embodying a rotary bleeding knife which may be readily controlled by the operator or killer to prevent rotation of the knife until properly positioned in the mouth of the fowl.

A still further object is to provide a combined bleeding and braining device of a construction permitting ready handling of the device for accomplishing both the bleeding and sticking operations.

Other objects and advantages of the invention will be apparent during the course of the following detailed description, taken in connection with the accompanying drawing forming a part of this specification and in which drawing:

Figure 1 is a view in side elevation of the bleeder device in use and showing the drive means for the rotary blade or knife.

Figure 2 is an enlarged fragmentary top plan view of the forward end portion of the bleeding and braining device.

Figure 3 is a fragmentary view of the forward end portion of the device and showing a portion of the guard in section.

Figures 4 and 5 are transverse sections on the respective lines in Figure 3.

In the drawing wherein similar reference characters designate corresponding parts thruout the several views, the letter A designates a combined bleeding and braining device and B the drive means for the bleeding knife of the device A.

The device A comprises a pistol grip handle 5 preferably formed of cast aluminum and embodying a shank or barrel portion 6 formed at its rear end with a stock or butt 7 providing a hand grip. The shank or barrel 6 is axially bored to rotatably receive a spindle 8 having its forward end extending a substantial distance beyond the forward end of the barrel. Non-rotatably mounted upon the forward end of the spindle 8 and secured as by a retaining nut 9 is a rotary bleeding knife or disc 10.

Extended longitudinally of the spindle 8 is a guard or shield 11 of semicircular shape in cross section and secured at its rear portion to the barrel 6 as by the cap screws 12. This guard or shield 11 extends for the entire length of the spindle 8 and has its outer or forward end curved inwardly as at 13 beyond the disc 10. The guard 11 as will be observed in Figure 4 covers one-half of the disc 10 so that the forward end of the guard serves to protect the sides of the fowl's mouth from being cut when the disc is rotated. Slightly to the rear of the disc 10 the guard 11 is formed with a web 15 thru which the spindle 8 projects and this web acts to hold the cutting edge of the disc 10 from contacting with the metal guard 11. The web 15 will also form a loose bearing support for the spindle 8 which will of necessity be relatively small and approximately $\frac{3}{16}''$ in diameter.

Mounted at one end upon the upper side of the barrel 6 just rearward of the guard 11 is a sticking or braining knife 18. The braining knife 18 is preferably mounted between eyes 19 cast integral with the barrel 6 and adjustably held by a clamping bolt 20 extended thru the eyes and butt end of the knife. This mounting of the sticking knife 18 permits the knife to be disposed at adjusted angular positions with respect to the axis of the barrel 6. This permits disposing of the sticking knife at positions most convenient for use by the particular operator.

Referring now to the drive means B for imparting rotation to the bleeding knife or disc 10, the same preferably consists of an electric motor 25 of conventional construction and provided with a built-in magnetic brake. This form of electric motor is now in general use, the magnetic brake serving to quickly stop rotation of the motor when the current is broken. The motor 25 may be supported from a hanger 26 which extends above the motor and is provided with an eye 27 for receiving an overhead wire cable whereby the motor may be moved along the cable.

A flexible drive is provided between the motor 25 and spindle 8 and includes the usual flexible drive shaft casing 28 in which is arranged the flexible drive shaft 29 which may be connected at one end in any suitable manner to the rear end of the spindle 8. The rear end of the barrel 6 is provided with a suitable boss 30 providing means for attaching the drive shaft casing 28 to the pistol grip or frame 5. A suitable brace 31 may extend from the hanger 26 and be secured to the flexible drive shaft casing 28 below the motor.

A control means is provided for controlling the motor 25 from the device A and includes any suitable form of trigger switch 35 mounted in the hand grip or butt 7 and connected by the electric cable 36 to the motor 25. The electric cable 36 may be secured along the drive shaft casing 28 by suitable clips 37. The operator may thus readily control rotation of the bleeding knife 10 by merely closing his grip about the butt 7.

In use, the operator grasps the hand grip 7 and inserts the shielded bleeding knife well back into the mouth of the fowl with the concaved side of the shield toward the roof of the mouth. The trigger switch 36 is then pulled which automatically releases the magnetic brake in the motor 25 and starts operation of the motor which rotates the bleeding knife 10. Owing to the fact that the knife 10 rotates in a plane at a right angle to the jugular veins which extend longitudinally of the roof of the fowl's mouth, the veins will be positively severed and proper bleeding of the fowl will result. The trigger switch 35 is then released and thru the magnetic brake in the motor 25, the bleeding knife 10 is immediately stopped from rotating, permitting withdrawal of the knife from the fowl's mouth. This quick stopping of the rotation of the bleeding knife 10 allows for withdrawal of the knife immediately upon opening the trigger switch 35 without cutting and mutilating the mouth of the fowl. The operator then uses the sticking or braining knife 18 in the usual manner for stunning the fowl.

The braining or sticking operation accomplished by the knife 18 consists of using a short quick jab directly under an eye of the fowl so as to strike the brain. This does not kill the fowl immediately but stuns the fowl so that the feathers may be easily removed and without tearing the skin of the fowl.

Thus it will be seen that in use of the improved poultry bleeder and braining device, the possibility of a misbleed will be eliminated, resulting in a higher percentage of poultry being prepared for sale in the desired condition. It will also be noted that a novel arrangement has been disclosed wherein a revolving bleeding knife is employed and in the use of which the jugular veins will be positively severed for proper bleeding of the fowl and without liability of misbleed.

Changes in detail may be made to the form of invention herein shown and described, without departing from the spirit of the invention or the scope of the following claims.

I claim:

1. In a poultry bleeding device, a hand gripping frame including a shank portion, a spindle rotatable in the shank portion and projecting beyond the forward end thereof, a disc blade secured to the forward end of the spindle, a guard of semicircular shape in cross section secured to the forward end of the shank and projecting longitudinally of the spindle with its forward end curved inwardly at a point beyond the disc blade, and drive means for imparting rotation to the spindle.

2. In a poultry bleeding and braining device, a frame including a shank and a handle projecting obliquely from the rear end of the shank; a spindle axially mounted in the shank and projecting from the forward end thereof; a disc blade secured to the projecting portion of the spindle; means for rotating the spindle; and a braining blade carried by the forward end portion of the shank in radially offset relation to said handle, said blade extending with its longitudinal portion in forwardly diverging relation to the axis of said shank.

TIMOTHY FIELD.